United States Patent
De Palo et al.

(10) Patent No.: US 12,291,628 B2
(45) Date of Patent: May 6, 2025

(54) PROPYLENE POLYMER FIBERS

(71) Applicant: BASELL POLIOLEFINE ITALIA S.R.L., Milan (IT)

(72) Inventors: Roberto De Palo, Ferrara (IT); Jaume Marti Porqueres, Reus (ES); Renaud Lemaire, Brussels (BE); Claudio Cavalieri, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 649 days.

(21) Appl. No.: 17/616,854

(22) PCT Filed: May 18, 2020

(86) PCT No.: PCT/EP2020/063778
§ 371 (c)(1),
(2) Date: Dec. 6, 2021

(87) PCT Pub. No.: WO2020/244912
PCT Pub. Date: Dec. 10, 2020

(65) Prior Publication Data
US 2022/0306848 A1    Sep. 29, 2022

(30) Foreign Application Priority Data

Jun. 7, 2019  (EP) .................................... 19179084

(51) Int. Cl.
*C08L 23/12*      (2006.01)
*B29C 48/00*      (2019.01)
(52) U.S. Cl.
CPC ............ *C08L 23/12* (2013.01); *B29C 48/022* (2019.02); *C08L 2203/12* (2013.01)
(58) Field of Classification Search
CPC ........ C08F 10/06; C08F 110/06; C08L 23/10; C08L 23/12; B29C 48/022
See application file for complete search history.

(56) References Cited

U.S. PATENT DOCUMENTS

| | | | |
|---|---|---|---|
| 4,399,054 A | 8/1983 | Ferraris et al. | |
| 4,469,648 A | 9/1984 | Ferraris et al. | |

FOREIGN PATENT DOCUMENTS

| | | |
|---|---|---|
| CN | 1685093 A | 10/2005 |
| EP | 2631269 A1 | 8/2013 |
| EP | 2679631 A1 | 1/2014 |
| WO | 9532091 A1 | 11/1995 |
| WO | 9844009 A1 | 10/1998 |
| WO | WO2006114318 A1 * | 11/2006 |
| WO | 2014001425 A1 | 1/2014 |
| WO | 2017118612 A1 | 7/2017 |
| WO | 2018104388 A1 | 6/2018 |
| WO | 2018167304 A1 | 9/2018 |
| WO | 2018211079 A1 | 11/2018 |

OTHER PUBLICATIONS

International Search Report and Written Opinion Mailed Jul. 24, 2020 (Jul. 24, 2020) for Corresponding PCT/EP2020/063778.

* cited by examiner

*Primary Examiner* — Marc S Zimmer
*Assistant Examiner* — Jeffrey S Lenihan

(57) ABSTRACT

A process for preparing fibers made from or containing propylene homopolymer having:
- a melting point ranging from 150° C. to 164° C.;
- a fraction soluble in xylene at 25° C. between 6.0 wt % and 2.0 wt %;
- a fraction soluble in acetone 25° C. between 0.5 wt % and 2.0 wt %;
- a ratio fraction soluble in xylene at 25° C./fraction soluble in acetone 25° C. between 0.30 and 0.60;
- a polydispersity index ranging from 2.8 to 4.5; and
- a melt flow rate (ISO 1133, 230° C./2.16 kg) between 2 to 40 g/10 min.

8 Claims, No Drawings

PROPYLENE POLYMER FIBERS

This application is the U.S. National Phase of PCT International Application PCT/EP202020/063778, filed May 18, 2020, claiming benefit of priority to European Patent Application No. 19179084.9, filed Jun. 7, 2019, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a process for preparing fibers made from or containing a polypropylene homopolymer.

BACKGROUND OF THE INVENTION

In some instances, polypropylene is extruded into fibers. In some instances, the polypropylene is a homopolymer or a copolymer of propylene having a melting point in the range from 100° C. to 145°.

SUMMARY OF THE INVENTION

In a general embodiment, the present disclosure provides a process for preparing fibers made from or containing a propylene homopolymer having
  a melting point ranging from 150° C. to 164° C.;
  a fraction soluble in xylene at 25° C. between 6.0 wt % and 2.0 wt %;
  a fraction soluble in acetone 25° C. between 0.5 wt % and 2.0 wt %;
  a ratio fraction soluble in acetone at 25° C./fraction insoluble in acetone 25° C. between 0.30 and 0.60;
  a polydispersity index ranging from 2.8 to 4.5; and
  a melt flow rate (ISO 1133, 230° C./2.16 kg) between 2 to 40 g/10 min.

DETAILED DESCRIPTION OF THE INVENTION

In some embodiments, the present disclosure provides a process for preparing fibers made from or containing a propylene homopolymer having
  a melting point ranging from 150° C. to 164° C.; alternatively from 155° C. to 163° C.; alternatively from 158° C. to 163° C.
  a fraction soluble in xylene at 25° C. between 6.0 wt % and 2.0 wt %; alternatively between 5.0 wt % and 2.5 wt %; alternatively between 4.5 wt % and 3.0 wt %;
  a fraction soluble in acetone 25° C. between 0.5 wt % and 2.0 wt %, alternatively between 0.8 wt % and 1.5 wt %;
  a ratio fraction soluble in acetone at 25° C./fraction insoluble in acetone 25° C. between 0.30 and 0.60; alternatively between 0.35 and 0.55; alternatively between 0.43 and 0.50;
  a polydispersity index ranging from 2.8 to 4.5; alternatively from 3.0 to 4.0; and
  a melt flow rate (ISO 1133, 230° C./2.16 kg) between 2 and 40 g/10 min; alternatively between 5 and 20 g/10 min; alternatively between 7 and 15 g/10 min.

In some embodiments, the polypropylene homopolymer has a very low oligomer content. It is believed that the low level of oligomer content lower the production of fumes during the production of fibers. In some embodiments, the oligomer content is lower than 1500 ppm; alternatively lower than 1200 ppm; alternatively lower than 1000 ppm.

In some embodiments, the propylene homopolymers are prepared by a process including the step of polymerizing propylene with ethylene, in the presence of a catalyst made from or containing the product of a reaction between:
  (i) a solid catalyst component made from or containing Ti, Mg, Cl, and at least one electron donor compound containing from 0.1 to 50% wt of Bi with respect to the total weight of the solid catalyst component;
  (ii) an alkylaluminum compound; and
  (iii) an external electron-donor compound having the formula:

$$(R^1)_a Si(OR^2)_b$$

wherein $R^1$ and $R^2$ are independently selected among alkyl radicals with 1-8 carbon atoms, optionally containing heteroatoms, a is 0 or 1, and a+b=4.

In some embodiments, the external donor is an ester of glutaric acid, alternatively an alkyl ester of glutaric acid; alternatively the ester of glutaric acid is used in a mixture with 9,9-bis(alkoxymethyl)fluorene. In some embodiments, the molar ratio between esters of glutaric acid and 9,9-bis(alkoxymethyl)fluorene is from 50:50 to 90:10; alternatively from 60:40 to 80:20; alternatively from 65:35 to 75:25. In some embodiments, the alkyl radical is a $C_1$-$C_{10}$ alkyl radical. In some embodiments, the $C_1$-$C_{10}$ alkyl radical is selected from the group consisting of a methyl, ethyl propyl; butyl radicals. In some embodiments, the alkyl ester of glutaric acid is 1 3,3-dipropylglutarate. In some embodiments, the 9,9-bis(alkoxymethyl)fluorene is 9,9-bis(methoxymethyl)fluorene.

In some embodiments and in the catalyst component, the content of Bi ranges from 0.5 to 40% wt, alternatively from 1 to 35% wt, alternatively from 2 to 25% wt, alternatively from 2 to 20% wt, based upon the total weight of the solid catalyst component.

In some embodiments, the particles of the solid component have substantially spherical morphology and an average diameter ranging between 5 and 150 μm, alternatively from 20 to 100 μm, alternatively from 30 to 90 μm. As used herein, the term "substantially spherical morphology" refers to particles having the ratio between the greater axis and the smaller axis equal to or lower than 1.5, alternatively lower than 1.3.

In some embodiments, the amount of Mg ranges from 8 to 30% wt, alternatively from 10 to 25% wt, based upon the total weight of the solid catalyst component.

In some embodiments, the amount of Ti ranges from 0.5 to 5% wt, alternatively from 0.7 to 3% wt, based upon the total weight of the solid catalyst component.

In some embodiments, the Mg/Ti molar ratio is equal to, or higher than, 13, alternatively in the range of 14 to 40, alternatively from 15 to 40. In some embodiments, the Mg/donor molar ratio is higher than 16, alternatively higher than 17, alternatively ranging from 18 to 50.

In some embodiments, Bi atoms are derived from one or more Bi compounds not having Bi-carbon bonds. In some embodiments, the Bi compounds are selected from the group consisting of Bi halides, Bi carbonate, Bi acetate, Bi nitrate, Bi oxide, Bi sulfate, and Bi sulfide. In some embodiments, the Bi compounds have the valence state of 3+. In some embodiments, the Bi compounds are selected from the group consisting of Bi trichloride and Bi tribromide. In some embodiments, the Bi compound is $BiCl_3$.

In some embodiments, the solid catalyst component is prepared by reacting a titanium compound of the formula Ti(OR)$_{q-y}$X$_y$, where q is the valence of titanium and y is a number between 1 and q, with a magnesium chloride deriving from an adduct of formula MgCl$_2$·pROH, where p is a number between 0.1 and 6, alternatively from 2 to 3.5, and R is a hydrocarbon radical having 1-18 carbon atoms. In some embodiments, the titanium compound is TiCl$_4$. In some embodiments, the adduct is prepared in spherical form by mixing alcohol and magnesium chloride, operating under stirring conditions at the melting temperature of the adduct (100-130° C.). Then, the adduct is mixed with an inert hydrocarbon immiscible with the adduct, thereby creating an emulsion which is quickly quenched, causing the solidification of the adduct in form of spherical particles. In some embodiments, the procedure for the preparation of the spherical adducts is as disclosed in U.S. Pat. Nos. 4,399,054 and 4,469,648. In some embodiments, the resulting adduct is directly reacted with a Ti compound or subjected to thermally controlled dealcoholation (80-130° C.), thereby obtaining an adduct wherein the number of moles of alcohol is lower than 3, alternatively between 0.1 and 2.5. In some embodiments, the reaction with the Ti compound is carried out by suspending the adduct (dealcoholated or not) in cold TiCl$_4$; the mixture is heated up to 80-130° C. and kept at this temperature for 0.5-2 hours. In some embodiments, the temperature of the cold TiCl$_4$ is 0° C. In some embodiments, the treatment with TiCl$_4$ is carried out one or more times. In some embodiments, the electron donor compound is added during the treatment with TiCl$_4$.

Several ways are available to add one or more Bi compounds in the catalyst preparation. In some embodiments, the Bi compound(s) is/are incorporated directly into the MgCl$_2$·pROH adduct during the adduct's preparation. In some embodiments, the Bi compound is added at the initial stage of adduct preparation by mixing the Bi compound together with MgCl$_2$ and the alcohol. In some embodiments, the Bi compound is added to the molten adduct before the emulsification step. The amount of Bi introduced ranges from 0.1 to 1 mole per mole of Mg in the adduct. In some embodiments, the Bi compound(s), which are incorporated directly into the MgCl$_2$·pROH adduct, are Bi halides, alternatively BiCl$_3$.

In some embodiments, the alkyl-Al compound (ii) is selected from the group consisting of trialkyl aluminum compounds, alkylaluminum halides, alkylaluminum hydrides and alkylaluminum sesquichlorides. In some embodiments, the alkyl-Al compound (ii) is a trialkyl aluminum compound selected from the group consisting of triethylaluminum, triisobutylaluminum, tri-n-butylaluminum, tri-n-hexylaluminum, and tri-n-octylaluminum. In some embodiments, the alkyl-Al compound (ii) is an alkylaluminum sesquichlorides selected from the group consisting of AlEt$_2$Cl and Al$_2$Et$_3$Cl$_3$. In some embodiments, the alkyl-Al compound (ii) is a mixture including trialkylaluminums. In some embodiments, the Al/Ti ratio is higher than 1, alternatively between 50 and 2000.

The external electron donor compound (iii) is a silicon compound having the formula

$$(R^1)_a Si(OR^2)_b \quad (II)$$

wherein R$^1$ and R$^2$ are independently selected among alkyl radicals with 1-8 carbon atoms, optionally containing heteroatoms, wherein a is 0 or 1 and a+b=4.

In some embodiments, the silicon compounds of formula (II) are wherein a is 1, b is 3 and R$^1$ and R$^2$ are independently selected from among alkyl radicals having 2-6, alternatively 2-4, carbon atoms.

In some embodiments, the silicon compound is isobutyl triethoxysilane (iBTES).

In some embodiments, the silicon compounds of the formula (II) are wherein a is 0, b is 4, and R$^2$ is independently selected from among alkyl radicals with 2-6, alternatively 2-4, carbon atoms. In some embodiments, the silicon compound is tetraethoxysilane.

In some embodiments, the external electron donor compound (iii) is used in an amount to give a molar ratio between the alkylaluminum compound (ii) and the external electron donor compound (iii) of from 0.1 to 200, alternatively from 1 to 100, alternatively from 3 to 50.

In some embodiments, the polymerization process is carried out in slurry polymerization using, as a diluent, an inert hydrocarbon solvent, or bulk polymerization using the liquid monomer as a reaction medium. In some embodiments, the liquid monomer is propylene. In some embodiments, the polymerization process is carried out in gas-phase operating in one or more fluidized or mechanically agitated bed reactors.

In some embodiments, the polymerization is carried out at temperatures of from 20 to 120° C., alternatively from 40 to 80° C. In some embodiments, the polymerization is carried out in gas-phase and the operating pressure is between 0.5 and 5 MPa, alternatively between 1 and 4 MPa. In some embodiments, the polymerization is carried out in bulk polymerization and the operating pressure is between 1 and 8 MPa, alternatively between 1.5 and 5 MPa. In some embodiments, hydrogen is used as a molecular weight regulator.

In some embodiments, the fibers are stable fibers or spunbond fibers.

In some embodiments and for spunbond fibers, the propylene homopolymer is subjected to visbreaking, thereby achieving a certain melt flow rate (MFR). In some embodiments, the visbreaking, or controlled chemical degradation, is carried out by treating the precursor polypropylene with from 0.001 to 0.20 wt %, alternatively from 0.05 to 0.1 wt %, of free radical initiators. In some embodiments, the chemical degradation is carried out by contacting, under high shear conditions, the polymeric material with at least one free radical initiator at a temperature equal to or higher than the decomposition temperature of the free radical initiator. In some embodiments, the free radical initiators are peroxides having a decomposition temperature higher than 250° C., alternatively ranging from 150° to 250° C. In some embodiments, the peroxides are selected from the group consisting of di-tert-butyl peroxide, dicumyl peroxide, 2,5-dimethyl-2,5-di(tert-butylperoxy)hexyne, and 2,5-dimethyl-2,5-di(tert-butylperoxy)hexane. In some embodiments, the peroxides are commercially available from Akzo or Arkema under the name Trigonox 101 or Luperox 101, respectively.

In some embodiments, the fibers are further made from or containing additives. In some embodiments, the additives are selected from the group consisting of antioxidants, light stabilizers, heat stabilizers, nucleating agents, colorants and fillers.

In some embodiments, the fibers exhibit a value of tenacity at least equal to or higher than 20.0 cN/tex, alternatively higher than 25 cN/tex, alternatively higher than 26 cN/tex.

In some embodiments, the fibers have a titer ranging from 1 to 8 dtex, alternatively from 1.5 to 4.0 dtex.

In some embodiments, the fibers is spun at speeds higher than 3000 m/min, alternatively higher than 3300 m/min, alternatively higher than 3500 m/min.

In some embodiments, the fibers are spun at temperatures varying from 200° to 300° C. In some embodiments, the spinning temperature is lower than 250° C., alternatively between 230° and 250° C.

In some embodiments, the fibers are used in a process for making non-woven fabrics.

In some embodiments, the non-woven fabrics are producing using a spunbonding technique. As used herein, the term "spunbonding process" includes a non-woven manufacturing technique, whereby polymers are directly converted into endless filaments and stochastically deposited to form a non-woven material.

The following examples are given to illustrate, but not limit the present disclosure.

EXAMPLES

Characterizations
Xylene-Insoluble and Soluble Fraction at 25° C.

Xylene Solubles fraction was measured according to ISO 16 152-2005; with solution volume of 250 ml, precipitation at 25° C. for 20 minutes, 10 of which with the solution in agitation (magnetic stirrer), and drying at 70°.
Fraction Soluble in Acetone at 25° C.

A second aliquot of the filtered solution obtained according to the method for the determination of xylene soluble fraction at 25° C. was added with acetone (100 ml), thereby precipitating the amorphous part. Then the suspension was filtered on a Teflon membrane coupled with a steel frit on a flask, dried in an oven at 80° C. overnight and weighed, thereby determining the soluble and insoluble fractions.
Melt Flow Rate (MFR)

Measured according to ISO 1133 at 230° C. with a load of 2.16 kg, unless otherwise specified.
Titer of Filaments From a 10 cm long roving, 50 fibers were randomly selected and weighed. The total weight of the 50 fibers, expressed in mg, was multiplied by 2, thereby obtaining the titer in dtex.
Tenacity and Elongation at Break of Filaments From a 500 m roving, a 100 mm-long segment was cut and single fibers randomly selected. Each single fiber was fixed to the clamps of a Dynamometer and tensioned to break with a traction speed of 20 mm/min for elongations lower than 100% and 50 mm/min for elongations greater than 100%, the initial distance between the clamps being of 20 mm. The ultimate strength (load at break) and the elongation at break were determined in machine (MD) direction.

The tenacity was calculated by way of the following equation:

Tenacity=Ultimate strength($cN$)×10/Titer(dtex).

Maximum Spinning Speed

It is believed that the maximum spinning speed corresponds to the highest spinning rate that can be maintained for 30 minutes with no filament break.
Softness Haptics It is believed that the softness index is a measure of flexibility of fibers. The softness index is calculated as weight [1/g] of a bundle, whose length is determined in standard conditions. The apparatuses used for such analysis are the following:
  Twist measuring device (Torcimetro by Negri e Bossi Spa)
  Analytical balance (by Mettler)
  Softness tester (by Clark).

The sample was prepared by providing a fiber bundle of about 4,000 dtex in linear density and 0.6 m in length. The ends of the bundle were fixed on the clamps of the twist measuring device and a 120 leftward twist runs was applied. The twisted bundle was taken off from the device, and untwisting was avoided. The two ends of the twisted bundle were taken in the same side, and the halves were wound around each other until the bundle assumed the stable form of a cord. A minimum of three specimens of each test were prepared. The bundle was bent in two, and the ends were fixed between the rolls of the Clark softness tester, leaving a distance of 1 cm between the two halves. The plane of the device was rotated rightward and stopped. When the bundle reversed its bending direction, the rotation angle (a) was noted. Subsequently the plane rotated leftward and again stopped. When the bundle reversed its bending side, the rotation angle (b) was noted. The height of the bundle above the two rolls was adjusted, thereby having the sum a±b equal to 90°+/−1°. This height was measured (sensitivity 1 mm). Each of the two angles, a and b, should not exceed the limits of 45°+/−15°. The bundle was taken off from the device and cut to a height corresponding to that previously measured. The cut bundle was weighed by an analytical balance with a precision of 0.1 mg. The Softness index was calculated from: S.I.=(1/W)*100, wherein W is the weight, in grams, of the cut bundle. The final result was the average of the 3 samples. The sensitivity in measuring the bundle weight was 0.1 mg.
Melting Temperature Via Differential Scanning Calorimetry (DSC)

The melting points of the polymers (Tm) were measured by differential scanning calorimetry (DSC) on a Perkin Elmer DSC-1 calorimeter, previously calibrated against indium melting points, and according to ISO 11357-1, 2009 and 11357-3, 2011, at 20° C./min. The weight of the samples in the DSC crucible was kept at 6.0±0.5 mg.
To obtain the melting point, the weighed sample was sealed into aluminum pans and heated to 200° C. at 20° C./minute. The sample was kept at 200° C. for 2 minutes, thereby allowing a complete melting of the crystallites, then cooled to 5° C. at 20° C./minute. After standing 2 minutes at 5° C., the sample was heated for the second run time to 200° C. at 20° C./min. In this second heating run, the peak temperature (Tp,m) was taken as the melting temperature.
Determination of Mg, Ti The determination of Mg and Ti content in the solid catalyst component was carried out via inductively coupled plasma emission spectroscopy on "I.C.P Spectrometer ARL Accuris".

The sample was prepared by analytically weighing, in a "Fluxy" platinum crucible", 0.1÷0.3 grams of catalyst and 2 grams of lithium metaborate/tetraborate 1/1 mixture. After addition of some drops of KI solution, the crucible was inserted in a "Claisse Fluxy" for the complete burning. The residue was collected with a 5% v/v $HNO_3$ solution and then analyzed via ICP at the following wavelengths: Magnesium, 279.08 nm; Titanium, 368.52 nm.
Determination of Bi The determination of Bi content in the solid catalyst component was carried out via inductively coupled plasma emission spectroscopy on an "I.C.P Spectrometer ARL Accuris". The sample was prepared by analytically weighing in a 200 $cm^3$ volumetric flask 0.1-0.3 grams of catalyst. After the slow addition of both about 10 milliliters of 65% v/v $HNO_3$ solution and about 50 $cm^3$ of distilled water, the sample underwent a digestion for 4-6 hours. Then the volumetric flask was diluted to the mark with deionized water. The resulting solution was directly analyzed via ICP at the following wavelength: bismuth, 223.06 nm.

Determination of Internal Donor Content

The determination of the content of internal donor in the solid catalytic compound was done through gas chromatography. The solid component was dissolved in acetone, an internal reference was added, and a sample of the organic phase was analyzed in a gas chromatograph, thereby determining the amount of donor present in the starting catalyst compound.

Oligomer Content

The determination of oligomer content by solvent extraction consisted of treating 5 g of polypropylene sample with 10 ml of methylene dichloride ($CH_2Cl_2$) in an ultrasonic bath at 25° C. for 4 hours. 1 µl of the extracted solution was injected into a capillary column and analyzed by using FID, without any filtration. For quantitative estimation of oligomer content, a calibration based on external reference method was applied. A series of hydrocarbons (C12-C22-C28-C40) was used.

Examples 1—Preparation of Homopolymer

Procedure for the Preparation of the Spherical Adduct

Microspheroidal $MgCl_{2\cdot p}C_2H_5OH$ adduct was prepared according to the method described in Comparative Example 5 of Patent Cooperation Treaty Publication No. WO98/44009, with the difference that $BiCl_3$ in a powder form and in an amount of 3 mol % with respect to the magnesium was added before feeding the oil.

Procedure for the Preparation of the Solid Catalyst Component

Into a 500 ml round bottom flask, equipped with mechanical stirrer, cooler and thermometer, 300 ml of $TiCl_4$ were introduced at room temperature under a nitrogen atmosphere. After cooling to 0° C., 9.0 g of the spherical adduct were added while stirring. Then, diethyl 3,3-dipropylglutarate was sequentially added into the flask. The amount of charged internal donor was to meet a Mg/donor molar ratio of 13. The temperature was raised to 100° C. and maintained for 2 hours. Thereafter, stirring was stopped, the solid product was allowed to settle, and the supernatant liquid was siphoned off at 100° C.

After siphoning, fresh $TiCl_4$ and an amount of 9,9-bis(methoxymethyl)fluorene for producing a Mg/diether molar ratio of 13 were added. The mixture was then heated at 120° C. and kept at this temperature for 1 hour under stirring. Stirring was stopped again. The solid was allowed to settle. The supernatant liquid was siphoned off. The solid was washed with anhydrous hexane six times in a temperature gradient down to 60° C. and one time at room temperature. The solid was then dried under vacuum and analyzed.

Prepolymerization Treatment

Before introducing the solid catalyst component into the polymerization reactors, the solid catalyst component was contacted with triethyl aluminum (TEAL) and isobutyl-triethoxysilane (iBTES) as described in Table 1.

Polymerization

The polymerization run was carried out in continuous mode in a liquid phase loop reactor. Hydrogen was used as a molecular weight regulator. Polymerization conditions are indicated in Table 1.

Comparative Example 2

Comparative example 2 was carried out as with Example 1 with the exception that 9,9-bis(methoxymethyl)fluorene was used instead of diethyl 3,3-dipropylglutarate in an equivalent molar amount, thereby allowing the catalyst to contain the same total molar amount 1 of internal donors of the catalyst of Example 1.

Polymerization Conditions are Indicated in Table 1.

Thereafter, the polymer particles were mixed with a stabilizing additive composition in a twin screw extruder Berstorff ZE 25 (length/diameter ratio of screws: 34) and extruded under nitrogen atmosphere in the following conditions:

Rotation speed: 250 rpm;
Extruder output: 15 kg/hour;
Melt temperature: 245° C.

The stabilizing additive composition was made of the following components:

0.1% by weight of Irganox® 1010;
0.1% by weight of Irgafos® 168;
0.04% by weight of DHT-4A (hydrotalcite);
percent amounts being referred to the total weight of the polymer and stabilizing additive composition.

The Irganox® 1010 was 2,2-bis[3-[,5-bis(1,1-dimethyl-ethyl)-4-hydroxyphenyl)-1-oxopropoxy]methyl]-1,3-propanediyl-3,5-bis(1,1-dimethylethyl)-4-hydroxybenzene-propanoate, while Irgafos® 168 was tris(2,4-di-tert.-butylphenyl)phosphite. The characteristics relating to the polymer composition are reported in Table 2.

TABLE 1

| Polymerization conditions | | |
|---|---|---|
|  | Ex 1 | Comparative example 2 |
| TEAL/catalyst (wt ratio) | 5.7 | 6.0 |
| TEAL/ext donor (wt ratio) | 606 | 600 |
| Temperature ° C. | 75 | 75 |
| Pressure barg | 28.0 | 28.0 |
| $H_2/C_{3=}$ mol/mol | 0.0057 | 0.0042 |

Notes:
$C_{3=}$ = propylene.

The features of the polymer of Example 1 and Comparative Example 2 are reported in Table 2.

TABLE 2

| Example |  | 1 | Comp 2 | Comp 3 |
|---|---|---|---|---|
| Xylene solubles | wt % | 3.7 | 2.9 | 3.8 |
| Oil fraction (acetone solubles) | Wt % | 1.2 | 1.5 | 1.7 |
| Acetone insolubles | wt % | 2.5 | 1.4 | 2.1 |
| Ratio acetone solubles/insolubles |  | 0.48 | 1.07 | 0.81 |
| MFR | g/10 min | 10.3 | 15.4 | 12.2 |
| Oligomer content | ppm | 850 | 1640 | 1820 |
| Tm | ° C. | 160.9 | 161.6 | 161.3 |
| polydispersity |  | 3.4 | 3.5 | 3.5 |

Comparative Example 3 was HP2619, a propylene homopolymer for fibers commercially available from LyondellBasell.

Preparation of the Fibers

The polymers were extruded in a Leonard 25 spinning pilot line with screw L/D ratio of 5. The pilot line was commercially available from Costruzioni Meccaniche Leonard-Sumirago (VA). The operative spinning conditions are here reported.

Operative Conditions:
Hole diameter: mm 0.4
Hole number in the die: 41
Die temperature (° C.): 280

The properties of the filaments are reported in Table 3.

TABLE 3

|  |  | Example 1 | Comparative ex 2 | Comparative ex 3 |
|---|---|---|---|---|
| Maximum spinning speed | m/min | 4200 | 3900 | 4200 |
| Fiber titer | dTex | 1.75 | 1.75 | 1.75 |
| Tenacity | cN/Tex | 25.6 | 24.6 | 23 |
| Elongation at break | % | 415 | 400 | 390 |
|  | m/min | 2250 | 2250 | 2250 |
| Max spinning speed | m/min | 4200 | 3900 | 4200 |

During the spinning process, fumes generated from the homopolymer of Example 1 were negligible with respect to fumes generated from the homopolymer of Comparative Examples 2 and 3.

What is claimed is:

1. A process for preparing a fiber comprising:
    extruding a propylene homopolymer to form a fiber, wherein the polypropylene homopolymer has:
    (i) a melting point ranging from 150° C. to 164° C.;
    (ii) a fraction soluble in xylene at 25° C. between 6.0 wt. % and 2.0 wt. %,
        (a) wherein the fraction soluble in xylene at 25° C. contains a fraction soluble in acetone at 25° C. and a fraction insoluble in acetone at 25° C.,
        (b) wherein the fraction soluble in acetone at 25° C. between 0.5 wt. % and 2.0 wt. %, based on the total weight of the polypropylene homopolymer;
        (c) wherein the fraction soluble in xylene at 25° C. contains a ratio of the fraction soluble in acetone at 25° C. to the fraction insoluble in acetone 25° C. between 0.30 and 0.60;
    (iii) a polydispersity index ranges from 2.8 to 4.5; and
    (iv) a melt flow rate (ISO 1133, 230° C./2.16 kg) between 2 to 40 g/10 min.

2. The process for preparing a fiber according to claim 1, wherein the melting point of the propylene homopolymer ranges from 155° C. to 163° C.

3. The process for preparing a fiber according to claim 1, wherein the fraction soluble in xylene at 25° C. is between 5.0 wt. % and 2.5 wt. %.

4. The process for preparing a fiber according to claim 1, wherein the fraction soluble in xylene at 25° C. is between 4.5 wt. % and 3.0 wt. %.

5. The process for preparing a fiber according to claim 1, wherein the fraction soluble in acetone 25° C. is between 0.8 wt. % and 1.5 wt. %.

6. The process for preparing a fiber according to claim 1, wherein the polydispersity index ranges from 3.0 to 4.0.

7. The process for preparing a fiber according to claim 1, wherein the melt flow rate (ISO 1133, 230° C./2.16 kg) is between 5.0 and 20.0 g/10 min.

8. The process for preparing a fiber according to claim 1, wherein the melt flow rate (ISO 1133, 230° C./2.16 kg) is between 7.0 and 15.0 g/10 min.

* * * * *